Figure 1:
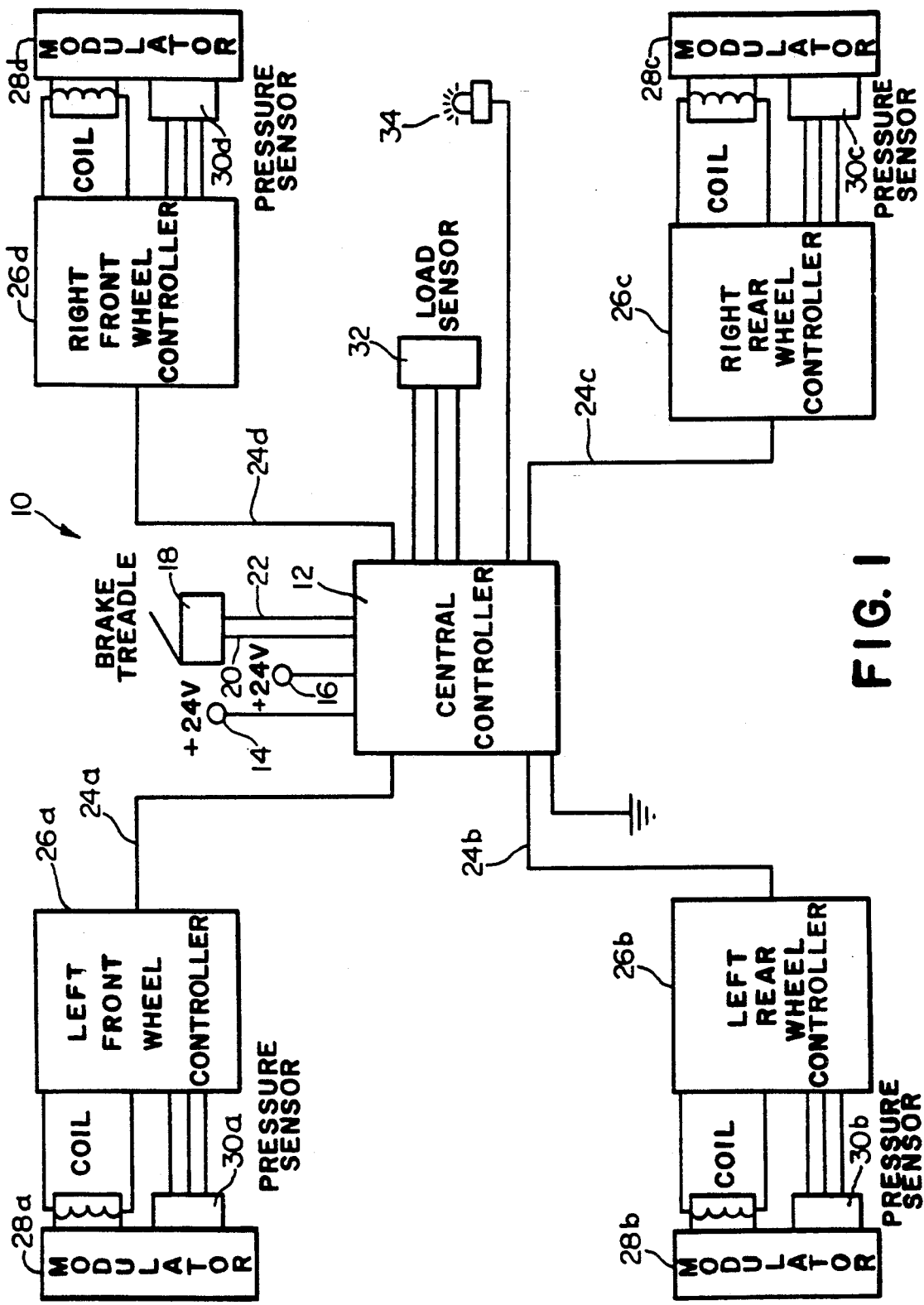

United States Patent [19]
Singleton et al.

[11] Patent Number: 5,288,139
[45] Date of Patent: Feb. 22, 1994

[54] ELECTROPNEUMATIC BRAKING SYSTEM

[75] Inventors: William A. Singleton, Grafton; Robert D. Burns, North Royalton, both of Ohio

[73] Assignee: Allied-Signal Inc., Morristown, N.J.

[21] Appl. No.: 894,386

[22] Filed: Jun. 5, 1992

[51] Int. Cl.⁵ ............................................. B60T 13/68
[52] U.S. Cl. ........................................ 303/15; 303/20
[58] Field of Search .................. 303/3, 7, 9.61, 9.66, 303/9.69, 15-17, 20, 115.2, DIG. 1-DIG. 4; 364/426.01, 426.02; 188/180, 182

[56] References Cited

U.S. PATENT DOCUMENTS

| | | | |
|---|---|---|---|
| 4,749,238 | 6/1988 | Singleton et al. | 303/15 |
| 4,787,683 | 11/1988 | Singleton | 303/110 |
| 4,802,562 | 2/1989 | Kuroyanagi et al. | 303/20 X |

FOREIGN PATENT DOCUMENTS

| | | |
|---|---|---|
| 0204483 | 12/1986 | European Pat. Off. |
| 0386952 | 9/1990 | European Pat. Off. |
| 0467112 | 1/1992 | European Pat. Off. |
| 8902383 | 3/1989 | World Int. Prop. O. |

*Primary Examiner*—Robert J. Oberleitner
*Assistant Examiner*—Josie A. Ballato
*Attorney, Agent, or Firm*—Ken C. Decker; William N. Antonis

[57] ABSTRACT

A control for an electropneumatic braking system applies a step function to a electronically operated proportional modulator to improve transient response. The current is controlled by a treadle operated signal generator operated by the vehicle operator and by actual feedback braking pressure as generated by a pressure sensor which senses braking pressure. The system includes a master controller which receives and processes information from the operator operated treadle operated signal generator and transmits desired pressure signals to wheel controllers which independently control each wheel of the vehicle.

15 Claims, 4 Drawing Sheets

ELECTROPNEUMATIC BRAKING SYSTEM

This invention relates to an electronically controlled fluid pressure braking system for heavy duty vehicles.

Existing heavy duty vehicles are equipped with pneumatic braking systems in which the brakes are actuated by pneumatic control signals generated by the vehicle operator by operating a treadle actuated brake valve. In order to simplify the system and to speed up brake application and release, it has been proposed to equip such vehicles with electronic controls. Instead of transmitting brake control signals pneumatically through conduits, such electropneumatic braking systems generate electrical signals actuating the brakes of the vehicle by operating modulating valves which control communication between a fluid pressure source and the brakes of the vehicle. Such a prior art electropneumatic system is disclosed in U.S. Pat. No. 4,749,238. This system discloses an electropneumatic system in which brake control signals are generated electrically and the brake application effected is controlled by a modulator controlled by the magnitude of the electrical signal.

In order to speed up control and force the modulator to more closely follow the braking pressure being demanded by the vehicle operator, the present invention provides a master controller which scales the braking request signal generated by the vehicle operator and transmits a braking request signal to wheel controllers at each wheel of the vehicle. The wheel controllers receive the braking request signal from the master or central controller, and also receive feedback signals generated by pressure sensors which respond to actual braking pressure generated by the modulator. The wheel controllers generate electrical signals which control the modulator. Accordingly, closed loop pressure control is achieved. The wheel controllers include an open loop controller which converts the signal received from the master controller to a signal operating the modulator. Using this relationship, the pressure in the modulator eventually will become near the desired pressure, but the transient pressure response is too long. Accordingly, in order to improve the response, particularly when the braking pressure being demanded by the vehicle operator is rapidly increased or decreased, the modulator is driven more aggressively by providing a step change in the actuating signal changes in a predetermined manner as will hereinafter be described. Finally, after the step change is driven to zero, a proportional-integral-differential (PID) controller drives the actual pressure to the desired value. The PID controller balances the brakes around the vehicle since each of the modulators may behave differently as compared to the other modulators.

Figure 2A:
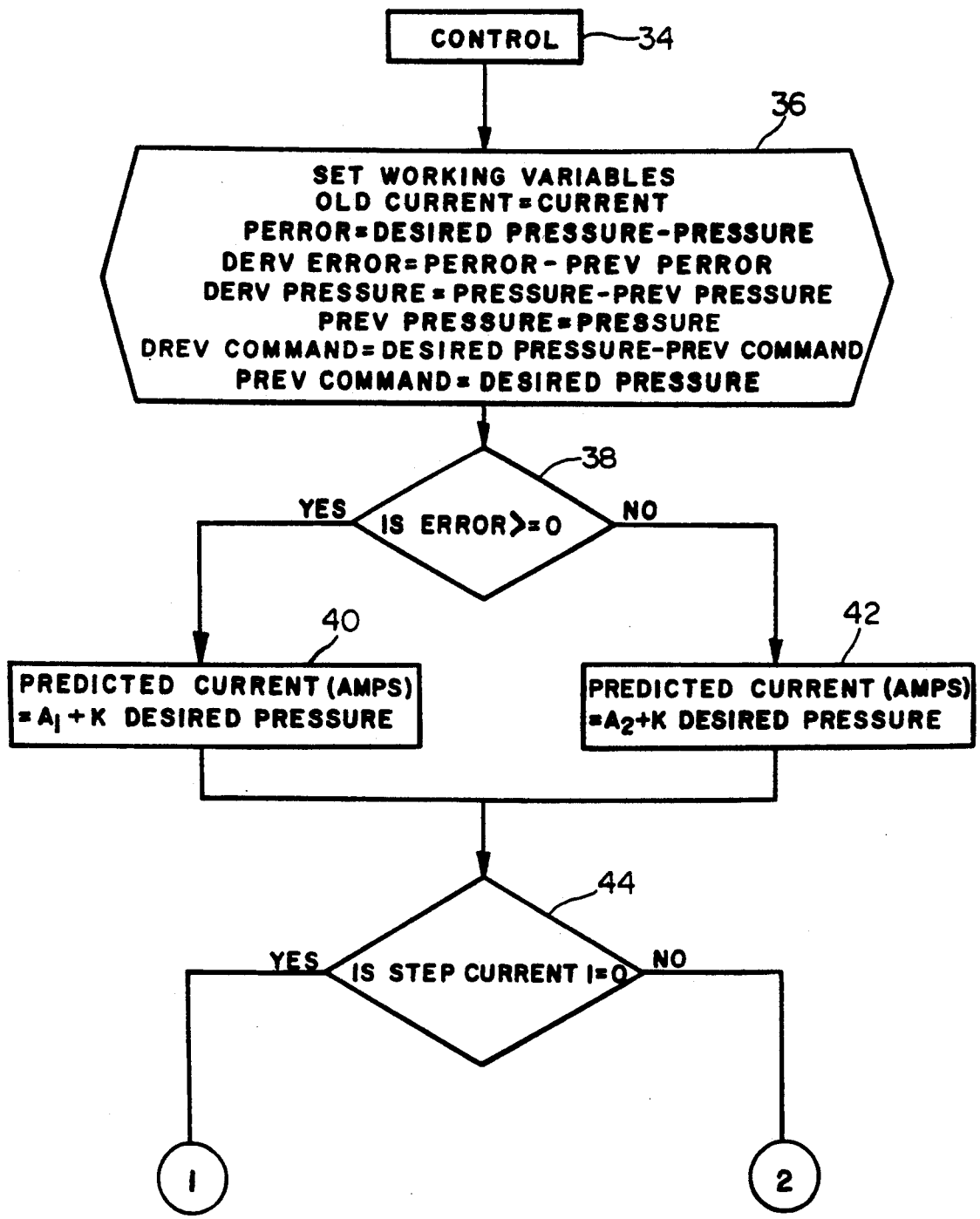
Figure 2B:
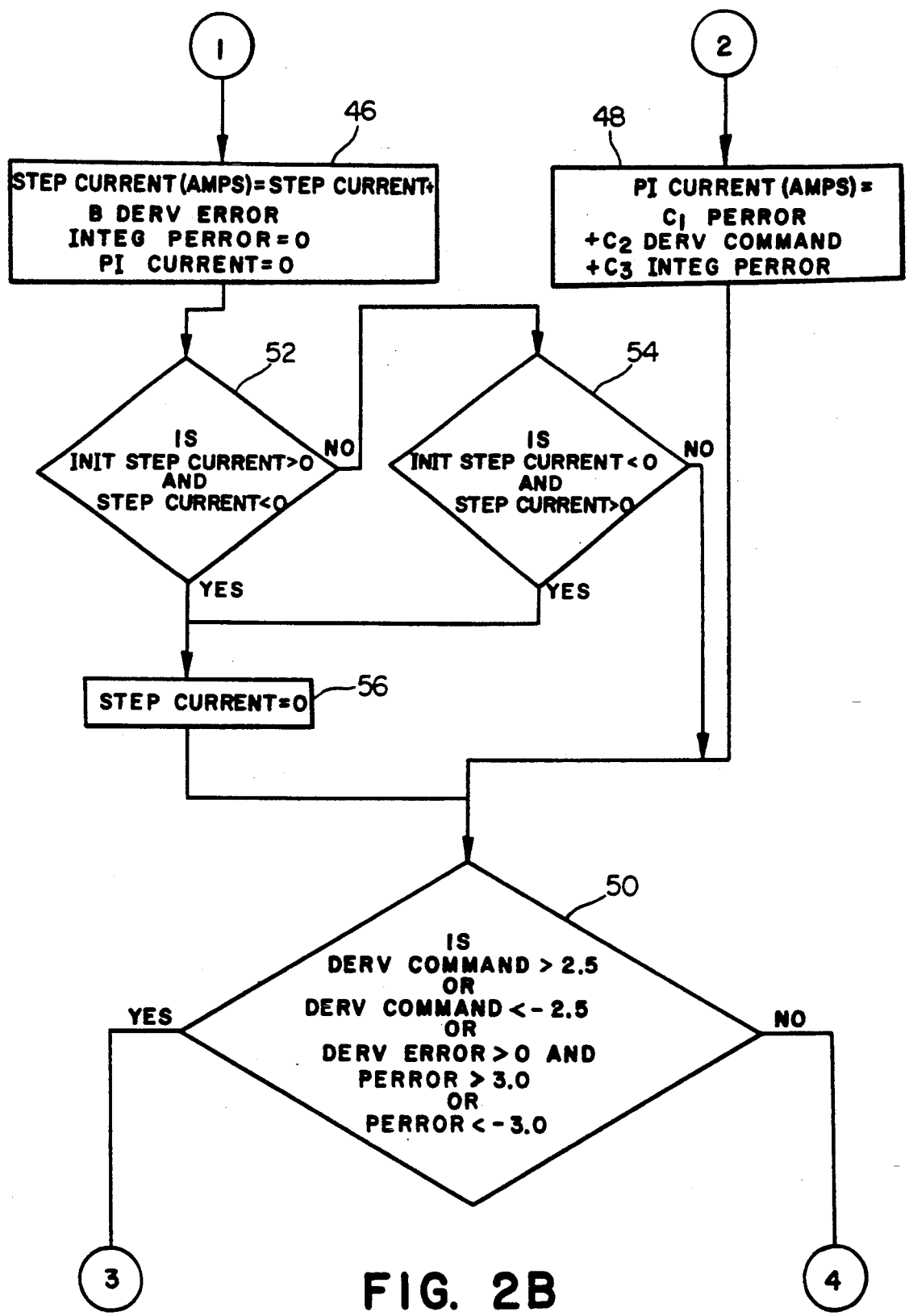
Figure 2C:
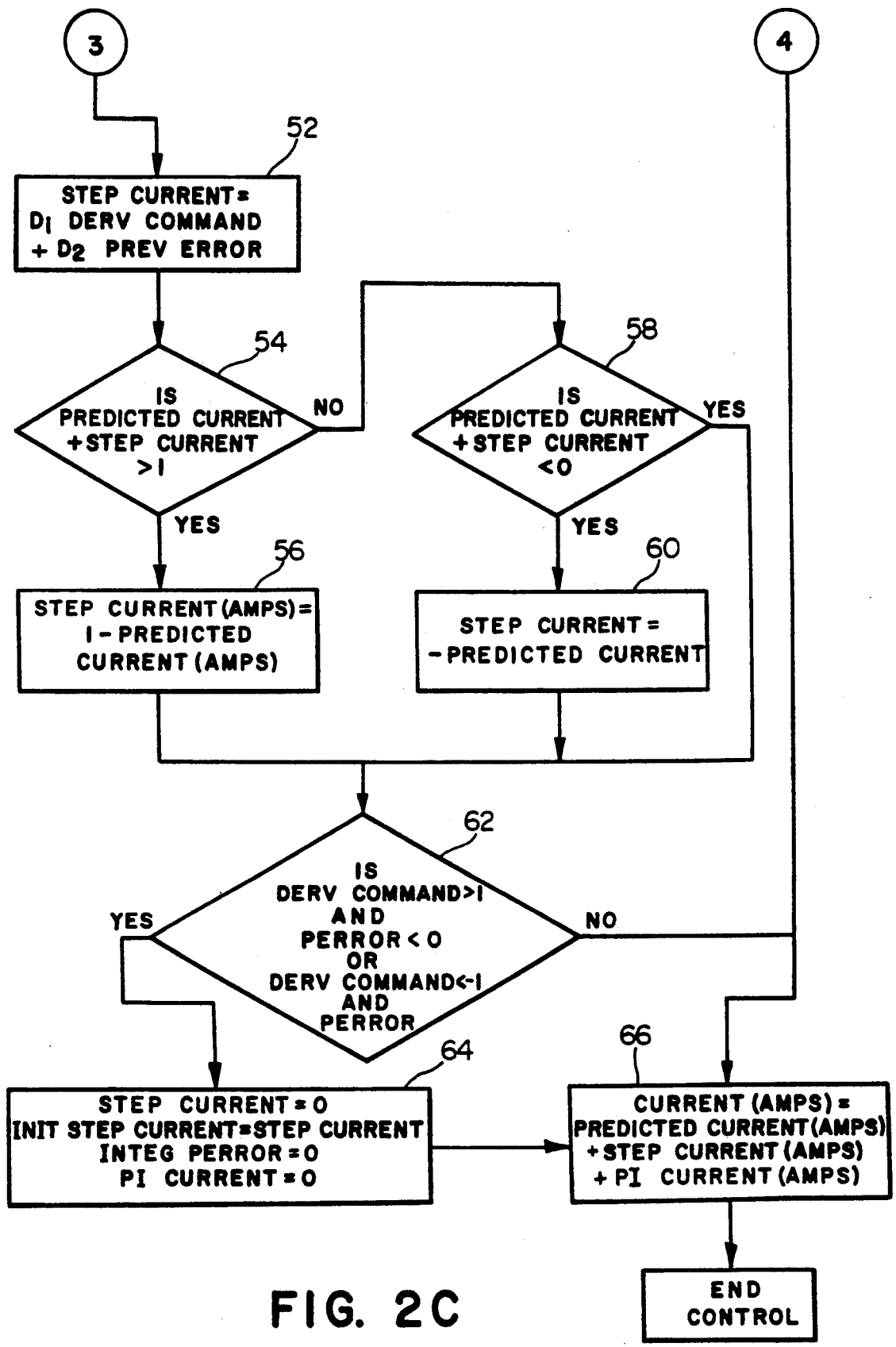

These and other features of the present invention will become apparent from the following description, with reference to the accompanying drawings, in which:

FIG. 1 is an overall system schematic of an electropneumatic braking system made pursuant to the teachings of the present invention; and FIGS. 2A, 2B, and 2C are a schematic logic diagram illustrating the manner in which the wheel controllers control the modulators used in the present system.

Referring now to the drawings, An electropneumatic braking system generally indicated by the numeral 10 includes a central or master controller generally indicated by the numeral 12. The master controller 12, for redundancy, preferably receives power from each of two 24 volt sources indicated at 14 and 16. A brake treadle signal generator generally indicated by the numeral 18 is mounted in the operator's compartment of the vehicle. Preferably, the signal generator 18, for redundancy, simultaneously generates two independent signals, each of which vary in accordance with the distance that the driver has depressed the brake treadle. These independent signals are transmitted to the central or master controller 12 through independent wires 20, 22.

The central or master controller 12 is connected by a data transmission line 24a to a left front wheel controller 26a, which controls a left front wheel brake pressure modulator 28a. Similarly, data transmission lines 24b, 24c, and 24d connect the central or master controller 12 with respectively a left rear wheel controller 26b, a right rear wheel controller 26c, and a right front wheel controller 26d. The left rear wheel controller 26b controls a left rear wheel modulator 28b; right rear wheel controller 26c controls right rear wheel modulator 28c; and right front wheel controller 26d controls right front wheel modulator 28d. A pressure sensor 30a transmits a signal representing the actual braking pressure transmitted to the left front wheel brake by the modulator 28a to the left front wheel controller 26a. Similarly, pressure sensor 30b transmits a signal representing the left rear wheel braking pressure to the left rear wheel controller 26b; pressure sensor 30c transmits a signal representing actual right rear wheel braking pressure to controller 26c; and pressure sensor 30d transmits a signal representing actual right front wheel brake pressure to the right front wheel controller 26d.

The main or central controller 12 processes the signals generated by the brake pedal signal generator 18 by scaling the signals, selecting one of the signals according to a predetermined protocol which determines if one or both of the signals is a malfunctioning signal, and sequentially transmits a signal representing desired braking pressure to each of the controllers 26a–d through the data transmission lines 24a–d. A signal is transmitted to each of the controllers 26a through 26d sequentially once every 15 milliseconds. The signals representing desired braking pressure transmitted over the data transmission lines 24a–d may be proportioned front to rear according to the load carried by the vehicle if the vehicle is equipped by a load sensor 32. The signal generated by the load sensor 32 is transmitted to the central or master controller 12. The central or master controller 12 may also modify the desired braking pressure signals transmitted over lines 24a–d by an antilock control program programmed within the central or master controller 12. The central or master controller 12 also performs the required diagnostic functions and indicates a warning light 34 in the operator's compartment in case of a malfunction of one or more of the controllers 26a–d, modulators 28a–d, or pressure sensors 30a–d. The brake pressure control signals transmitted to the controllers 26a–d is transmitted immediately before the data is to be used in calculating a control signal operating the corresponding modulator 28a–d.

Referring now to FIGS. 2-A, 2B, and 2C, a detailed description of the method in which the controllers 26a–d generate the control signals controlling the corresponding modulators 28a–d will be described. The program is started as indicated at 34, and proceeds to the set working variables function as indicated at 36. In naming the variables, the terms OLD or PREV refer to the value of the variable calculated during the last program cycle. Such values are stored in memory for use during the succeeding calculation cycle. As discussed above, the values are recalculated based on new data transmitted to the wheel controllers every 15 milliseconds.

The term OLD CURRENT and CURRENT refers to the magnitude of the control signal transmitted to the modulator by the wheel controllers. The term PERROR is the difference between the desired pressure, which is established by the vehicle operator by operating the brake treadle signal generator 18 and which is transmitted to the controllers 26a–d through the data transmission lines 24a–d, and the actual pressures at the brake actuators as sensed by the pressure sensors 30a–d. The term DERV ERROR is defined as the difference between PERROR calculated in the previous cycle and the value of PERROR calculated in the last program cycle. The term DERV PRESSURE is defined as the difference between actual pressure sensed by the corresponding one of the pressure sensors 30a–d and the actual pressure sensed by the same pressure sensor in the last program cycle. The variable PREV PRESSURE is set equal to the value of the actual pressure used in the calculations for the preceding cycle. The term DERV COMMAND is defined as the difference between the desired pressure and the previous commanded pressure. The previous commanded pressure is the desired pressure from the last program cycle. Of course, the calculations to set pressure at the brake controlling each wheel of the vehicle is made separately by each of the controllers 26a–d, using actual pressure as sensed by the corresponding pressure sensors 30a–d, and using the desired pressure transmitted over the corresponding data transmission lines 25a–d.

The value of PERROR, that is, the difference between the desired pressure established by the vehicle operator and the actual braking pressure sensed by the corresponding pressure sensor 30a–d, is then tested as indicated at 38 to determine if PERROR is positive or negative. If the error between desired and actual pressure is positive, PREDICTED CURRENT, which is the preliminary value of the control signal to be used to set the corresponding modulator 28a–d, is set equal to a constant A1 plus constant K times the desired pressure, as indicated at 40. If the value of the error between the desired and actual pressure is negative, the value of the PREDICTED CURRENT is set equal to a constant A2 plus a constant K times the value of the desired pressure, as indicated at 42. This is the control current which is used to drive the modulator open loop without regard to the actual pressure in the corresponding brake chamber. It should be noted that the slope of the change in PREDICTED CURRENT is the same whether the error is positive or negative, but the offset, which is equal to the difference between the constants A1–A2, is chosen to represent an approximation of the hysteresis curve of the modulator.

The pressure as set using the equation set forth in boxes 40 and 42 of FIG. 2 will eventually yield a pressure in the modulator near the desired pressure established by the vehicle operator in actuating the brake treadle signal generator 18, but the transient response of the pressure will be long. Accordingly, it is desirable to drive the modulators 28a–d more aggressively, to improve transient response. This is accomplished by adding a step current to the PREDICTED CURRENT calculated in boxes 40 and 42 of FIG. 1, under certain conditions which will be hereinafter explained. Accordingly, the program tests the value of STEP CURRENT stored in memory as calculated in the previous cycle at 44 to determine if STEP CURRENT is not equal to zero. If STEP CURRENT is not equal to zero, the program proceeds to 46 of FIG. 2B, where a new value of STEP CURRENT is calculated. If STEP CURRENT is equal to zero, the program proceeds to 48 in FIG. 2B, which calculates the PID (proportional-integral-differential) control current. This current is used to modify the PREDICTED CURRENT as calculated at 40-42 of FIG. 2 and drives the actual pressure to the desired pressure set by the vehicle operator smoothly in order that the brakes controlled by all four controllers are driven to substantially the same value at substantially the same time. The PI current, which is the change in the PREDICTED CURRENT representing the contribution of the PID controller, is calculated by adding a constant C1 times PERROR (the difference between actual and desired pressure), plus a constant C2 times DERV COMMAND (the present desired pressure minus the desired pressure on the last calculation cycle) plus a constant C3 times a signal ("INTEG PERROR") representing the integral of PERROR. The program then proceeds to decision block 50.

If a STEP CURRENT has been used in the previous calculation cycle a new value of STEP CURRENT is calculated as indicated at 46, but this new value may be further modified or recalculated before being applied to the corresponding modulator, as will hereinafter be described. The new value is calculated as being equal to the present value of STEP CURRENT plus a constant B times the DERV ERROR signal, which is the difference in the error between the desired and actual pressure calculated in the previous cycle and the current cycle. The integral of the PERROR signal is set equal to zero, and the PI current, is also set equal to zero. The value of STEP CURRENT is then tested, as indicated at 52 and 54, to determine if STEP CURRENT has switched from negative to positive, or positive to negative, in the current calculation cycle. If such a reversal has occurred, the value of STEP CURRENT is set equal to zero, as indicated at 56. A reversal of STEP CURRENT indicates that the desired braking pressure during two successive cycles is close to the desired value, so no step current is applied.

A decision is made at 50 as to whether or not to apply the existing value of STEP CURRENT or to calculate a new value of STEP CURRENT. As indicated at 50, a new value of STEP CURRENT is calculated if the change in the desired pressure between the last calculation and the current calculation cycle exceeds 2.5 psi, or if the error between actual and desired pressure is greater than zero (indicating that the error is increasing) and simultaneously the magnitude of the error (as indicated by the PERROR signal) exceeds 3 psi.

If the decision at 50 is that a new value of STEP CURRENT should be calculated, the magnitude of STEP CURRENT is calculated as indicated at 52. STEP CURRENT is set equal to a constant D, times DERV COMMAND plus constant D2 times PREV ERROR. Accordingly, the size of the step current is determined as a function of the change in the desired pressure between the current calculation cycle and the previous calculation cycle and the magnitude of the error between the actual and desired pressure. If the change in desired pressure is large, the system should apply a large step in the current. As indicated at 54, if the sum of the PREDICTED CURRENT calculated at 40 or 42 plus the STEP CURRENT calculated at 52 exceeds 1 amp, STEP CURRENT is set at one minus the PREDICTED CURRENT calculated at 40 or 42, as indicated at 56 in FIG. 4. If the PREDICTED CURRENT plus STEP CURRENT is less than zero, as determined at 58, STEP CURRENT is set at the negative of the PREDICTED CURRENT as indicated at 60.

If the desired pressure is increasing and the actual pressure is above the new desired pressure, it is not desirable to add the step current. Likewise, when the desired pressure is decreasing and the actual pressure is below the desired pressure, the step is not necessary. Accordingly, the error between the desired and actual pressure and the change in the desired pressure between the last calculation cycle and the current calculation cycle is tested at 62 so that if either of the two foregoing conditions are met, the program branches to 64, where STEP CURRENT is set equal to zero, INIT STEP CURRENT is set equal to STEP CURRENT, the value of the INTEG PERROR is set equal to zero, and the current generated by the PID control (the PI current) is also set equal to zero.

The program then branches to 66. If the conditions set forth at 50 are not met, the program branches directly to 66. Here the control signal, which controls the modulator, is set equal to the PREDICTED CURRENT as determined at 40 or 42, plus STEP CURRENT, plus the PI current representing the PID control. This current is then transmitted to the corresponding modulator.

We claim:

1. Method of controlling braking pressure in a fluid pressure braking system comprising the steps of generating a demanded braking pressure signal representing demanded braking pressure, measuring actual braking pressure and generating an actual braking pressure signal representing actual braking pressure, calculating a control signal for controlling an electrically actuated proportional brake pressure modulator for controlling braking pressure as a function of the magnitude of said control signal applied to the modulator, said control signal being calculated from the demanded braking pressure signal and the actual braking pressure signal, and modifying the magnitude of said control signal by a step increment when the pressure demand signal, the actual braking pressure signal, and the demanded braking pressure signal satisfy predetermined criteria.

2. Method of controlling braking pressure as claimed in claim 1, including the step of modifying said control signal by said step increment when the demanded braking pressure signal changes by more than a predetermined amount within a predetermined time period.

3. Method of controlling braking pressure as claimed in claim 2, including the step of recalculating said control signal during each of successive time periods, and establishing the size of the step increment for each time period as a function of the increment in demanded braking pressure signals between successive time periods.

4. Method of controlling braking pressure as claimed in claim 1, including the step of modifying said control signal by said step increment when the difference between said demanded braking pressure signal and the actual braking pressure signal is increasing in magnitude and exceeds a predetermined magnitude.

5. Method of controlling braking pressure as claimed in claim 2, including the step of recalculating said control signal during each of successive time periods, and establishing the size of the step increment for each time period as a function of the difference between the demanded braking pressure signal and the actual braking pressure signal in the time period preceding the time period for which the magnitude of the step increment is being determined.

6. Method of controlling braking pressure as claimed in claim 6, including the step of recalculating said control signal during each of successive time periods, and establishing the size of the step increment for each time period as a function of the increment in demanded braking pressure signals between successive time periods.

7. Method of controlling braking pressure as claimed in claim 6, including the step of recalculating the step increment in each successive time period until the magnitude of the step increment becomes less than a predetermined magnitude, and then controlling the demanded braking pressure signal after the step increment becomes less than the predetermined magnitude by proportional-integral-differential control until the demanded and actual braking signal becomes substantially zero.

8. Method of controlling braking pressure as claimed in claim 1, including the step of recalculating said control signal during each of successive time periods, and establishing the size of the step increment for each time period as a function of the difference between the demanded braking pressure signal and the actual braking pressure signal in the time period preceding the time period for which the magnitude of the step increment is being determined.

9. Method of controlling braking pressure as claimed in claim 8, including the step of recalculating the step increment in each successive time period until the magnitude of the step increment becomes less than a predetermined magnitude, and then controlling the demanded braking pressure signal after the step increment becomes less than the predetermined magnitude by a proportional-integral-differential control until the demanded and actual braking signal becomes substantially zero.

10. Method of controlling braking pressure as claimed in claim 1, including the step of recalculating said control signal during each of successive time periods until the magnitude of the step increment becomes less than a predetermined magnitude, and then controlling the demanded braking pressure signal after the step change becomes less than the predetermined magnitude by a proportional-integral-differential control until the demanded and actual braking signal becomes substantially zero.

11. System for controlling braking pressure in a fluid pressure braking system comprising an electrically actuated proportional brake pressure modulator for controlling braking pressure as a function of the magnitude of a control signal activating said modulator, an operator-actuated brake treadle for generating a demanded braking pressure signal representing the magnitude of a brake application demanded by the vehicle operator, a master controller for receiving said demanded braking pressure signal, a pressure sensor for measuring the actual braking pressure in at least one brake of the vehicle controlled by said modulator, and a pressure controller for receiving an actual braking pressure signal from said pressure sensor and for receiving said demanded braking pressure signal from said master controller, said pressure controller including means responsive to said demanded braking pressure signal and to said actual braking pressure signal for varying the magnitude of said control signal.

12. System for controlling braking pressure, in a fluid pressure braking system as claimed in claim 11, wherein there are multiple pressure controllers, each of said pressure controllers receiving identical demanded braking pressure signals from a single master controller, but receiving actual braking pressure signals from different ones of said brakes of the vehicle.

13. System for controlling braking pressure in a fluid pressure braking system as claimed in claim 12, wherein each of said pressure controllers includes step increment calculation means for changing said control signal by a step increment when the pressure demand signal, the actual braking pressure signal, and the demanded braking pressure signal satisfy predetermined criteria.

14. System for controlling braking pressure in a fluid pressure braking system as claimed in claim 13, wherein said step change calculation means includes means for recalculating said control signal during each of successive time periods until the magnitude of the step change becomes less than a predetermined magnitude.

15. System for controlling braking pressure in a fluid pressure braking system as claimed in claim 14, wherein said step change calculation means includes proportional-integral-differential controller means for controlling the demanded braking pressure signal after the step change becomes less that the predetermined magnitude and until the demanded and actual braking signal becomes substantially zero.

* * * * *